(12) United States Patent
Cheng et al.

(10) Patent No.: US 9,397,343 B1
(45) Date of Patent: Jul. 19, 2016

(54) COPPER FOIL EXHIBITING ANTI-SWELLING PROPERTIES

(71) Applicant: Chang Chun Petrochemical Co., Ltd., Taipei (TW)

(72) Inventors: Kuei-Sen Cheng, Taipei (TW); Yao-Sheng Lai, Taipei (TW); Yueh-Min Liu, Taipei (TW); Jui-Chang Chou, Taipei (TW)

(73) Assignee: Chang Chun Petrochemical Co., Ltd., Taipei (TW)

(*) Notice: Subject to any disclaimer, the term of this patent is extended or adjusted under 35 U.S.C. 154(b) by 0 days.

(21) Appl. No.: 14/884,101

(22) Filed: Oct. 15, 2015

(51) Int. Cl.
*H01M 4/70* (2006.01)
*H01M 4/66* (2006.01)
*H01M 4/587* (2010.01)
*H01M 4/485* (2010.01)
*H01M 4/04* (2006.01)
*H01M 10/0525* (2010.01)
*H01M 4/02* (2006.01)

(52) U.S. Cl.
CPC .............. *H01M 4/70* (2013.01); *H01M 4/0469* (2013.01); *H01M 4/485* (2013.01); *H01M 4/587* (2013.01); *H01M 4/661* (2013.01); *H01M 10/0525* (2013.01); *H01M 2004/027* (2013.01)

(58) Field of Classification Search
CPC ................................ H01M 4/70; H01M 4/661
See application file for complete search history.

(56) References Cited

U.S. PATENT DOCUMENTS

| | | | |
|---|---|---|---|
| 6,541,126 B1 | 4/2003 | Yoshioka et al. | |
| 7,982,380 B2 | 7/2011 | Kamiyama et al. | |
| 8,097,365 B2 | 1/2012 | Iwama et al. | |
| 8,852,802 B2 | 10/2014 | Hirose et al. | |
| 2001/0008091 A1 | 7/2001 | Takahashi et al. | |
| 2005/0175826 A1 | 8/2005 | Suzuki | |
| 2005/0233132 A1 | 10/2005 | Kojima | |
| 2006/0088723 A1* | 4/2006 | Suzuki | C25D 5/16 428/612 |
| 2007/0098910 A1 | 5/2007 | Yamagata et al. | |
| 2007/0231587 A1 | 10/2007 | Naito et al. | |
| 2007/0291463 A1 | 12/2007 | Ojiri et al. | |
| 2008/0200333 A1 | 8/2008 | Gotou et al. | |
| 2009/0233229 A1 | 9/2009 | Suzuki | |
| 2011/0005812 A1 | 1/2011 | Shimokawa et al. | |
| 2012/0189859 A1 | 7/2012 | Nozaki et al. | |
| 2013/0115510 A1 | 5/2013 | Tani et al. | |
| 2014/0193660 A1* | 7/2014 | Tsai | C25D 1/04 428/606 |
| 2015/0037609 A1 | 2/2015 | Kim et al. | |
| 2015/0237737 A1 | 8/2015 | Arai et al. | |

FOREIGN PATENT DOCUMENTS

| | | |
|---|---|---|
| JP | 2011179078 A | 9/2011 |
| TW | 201447051 A | 12/2014 |
| WO | WO-2006001594 A1 | 1/2006 |

* cited by examiner

*Primary Examiner* — Stewart Fraser
(74) *Attorney, Agent, or Firm* — Polsinelli PC

(57) ABSTRACT

The present disclosure relates to a copper foil which exhibits surprising anti-deformation properties (e.g., it is resistant to swelling, sagging, and wrinkling). Typically, the copper foil has (a) a shiny side with a surface roughness (Rz) in the range of 0.6 to 1.9 µm; (b) a matte side with a surface roughness (Rz) in the range of 0.6 to 1.9 µm; and (c) a lightness $L^*$ value of the matte side, based on the $L^*a^*b^*$ color system, in the range of 12 to 35. The disclosure further relates to an anode comprising an anode active material on an anode current collector, wherein the anode current collector includes the above-mentioned copper foil. The anodes are used in, for example, lithium ion secondary batteries.

20 Claims, 7 Drawing Sheets

COPPER FOIL EXHIBITING ANTI-SWELLING PROPERTIES

FIELD OF THE DISCLOSURE

The present disclosure relates to an improved copper foil that exhibits anti-swelling, anti-sag, and anti-wrinkle properties; to methods for manufacturing the copper foil; and to use of the copper foil in lithium ion secondary batteries.

BACKGROUND

A typical device for manufacturing an electrolytic copper foil comprises a metal cathode drum and an insoluble metal anode, the metal cathode drum being rotatable and having a mirror polished surface. The insoluble metal anode is arranged at approximately the lower half of the metal cathode drum and surrounds the metal cathode drum. A copper foil is continuously manufactured with the device by flowing a copper electrolytic solution between the cathode drum and the anode, applying direct current between these to allow copper to be electrodeposited on the cathode drum, and detaching an electrodeposited copper foil from the cathode drum when a predetermined thickness is obtained.

The copper foil is often used as a negative current collector for lithium-ion secondary batteries and for printed wiring boards. Lithium-ion secondary batteries include a positive electrode, a negative electrode, and an electrolyte. The negative electrode typically includes carbon particles applied as a negative electrode active material layer to the surface of a negative current collector made from the copper foil. As the negative electrode active substance, carbon-based materials such as graphite capable of absorbing/desorbing lithium ions are commonly used. More recently, silicon-based materials or tin-based materials having a larger theoretical capacity than graphite-based materials have been proposed. Lithium-ion secondary batteries are used in electronic devices such as cell-phones, video cameras, and personal computers. Along with downsizing of the electronic devices, downsizing and capacity increase of the lithium-ion secondary batteries are progressing. Initial charging capacity and charge-discharge property are particularly important among properties required for the lithium-ion secondary batteries.

SUMMARY OF THE DISCLOSURE

The instant disclosure relates to improved copper foil that exhibits anti-swelling, anti-sag, and anti-wrinkle properties. As copper foil becomes thinner, it is more difficult to handle and more susceptible to defects such as wrinkling. Elongation wrinkles (resulting from "swelling" or "sag") can develop after the electrodeposited copper foil is detached from the cathode drum. See, e.g., FIG. 7. When the roughness of the copper foil is low, the friction between the copper foil and guide rollers is lowered making it more likely that the copper foil will "slip and pull." This mechanical stress (e.g., the "slip and pull") can contribute to the formation of elongation wrinkles. Copper foil that exhibits undue swelling or sagging is problematic because it is not ideal for use in a negative electrode, due in part to the difficulty in coating it with an electrode active material, which leads to a higher incidence of failure during long term use.

The copper foil of the instant disclosure exhibits surprising anti-swelling, anti-sag, and anti-wrinkle properties. Copper foils typically have very high tensile strength immediately after manufacturing (about 70 kg/mm$^2$). The tensile strength gradually drops at room temperate until it ultimately stabilizes (at about 30-35 kg/mm$^2$). This drop in tensile strength is a result of room temperature recrystallization. If the copper foil's room temperature recrystallization rate is too fast, internal forces lead to swelling and deformation of the copper foil. A relationship exists between the L* (lightness value) of M-side of the copper foil and its room temperature recrystallization rate.

More specifically, copper foil having the following parameters exhibit anti-swelling and anti-sag properties leading to smoother post-electrodeposition processing, fewer elongation wrinkles, and better overall electrical properties, especially during long-term use:

(a) a shiny side with a surface roughness (Rz) in the range of 0.6 to 1.9 μm;
(b) a matte side with a surface roughness (Rz) in the range of 0.6 to 1.9 μm; and
(c) a lightness L* value of matte side, based on the L*a*b* color system, in the range of 12 to 35.

The copper foil may have an anode active material on one or both sides of the foil and serve as an anode current collector. The anode active material often contains, for example, a carbon active material (e.g., a carbonaceous material), a conductive additive, a thickening agent, and a binder. The copper foil of the instant disclosure is useful in, for example, batteries, electronic devices comprising the batteries, and/or in the electronic devices themselves (not in the battery).

BRIEF DESCRIPTION OF THE DRAWINGS

Implementations of the present technology will now be described, by way of example only, with reference to the attached figures, wherein.

Figure 1:
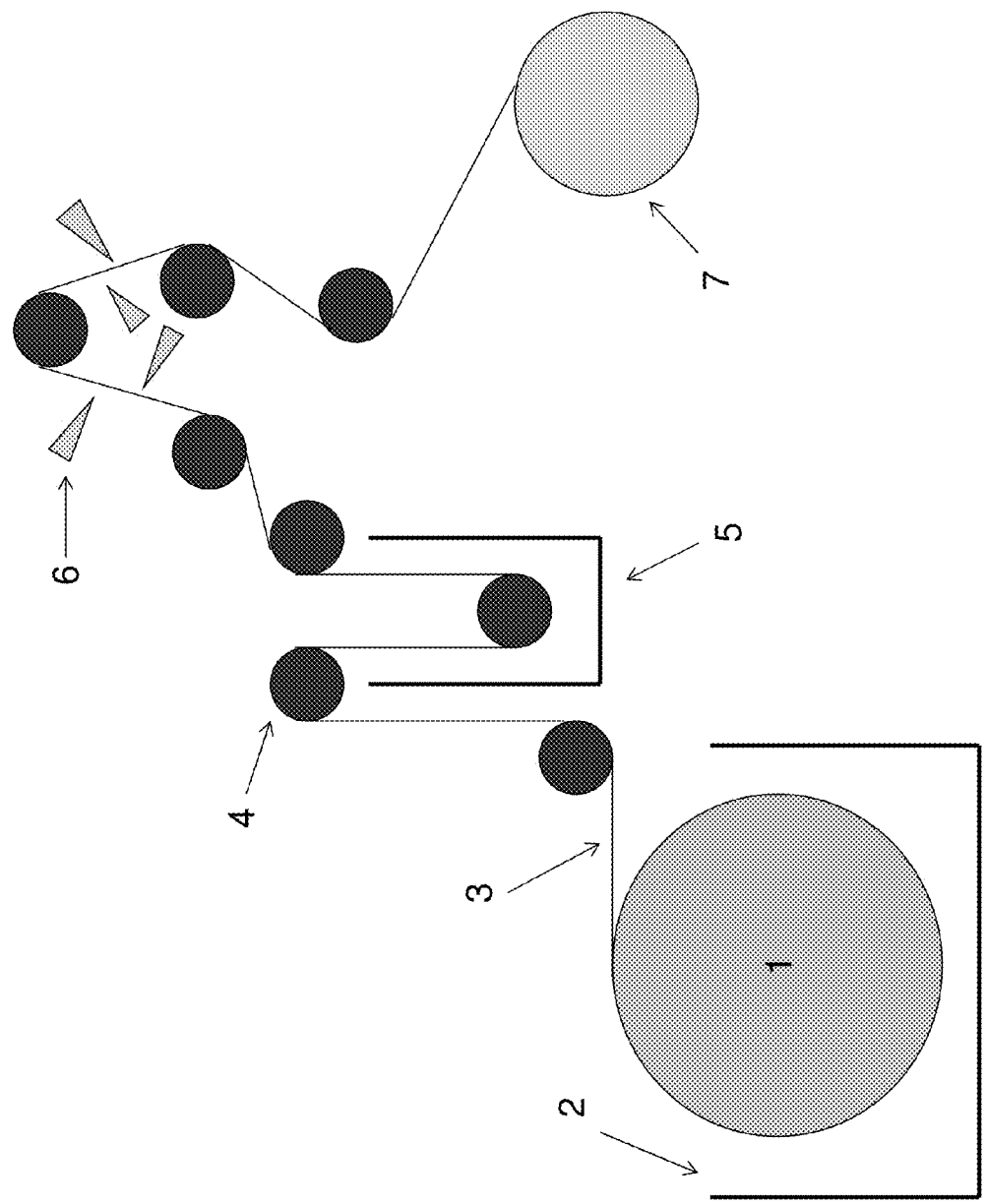
FIG. 1 is a diagram showing the manufacture and processing of copper foil.

It should be understood that the various aspects are not limited to the arrangements and instrumentality shown in the drawings.

DETAILED DESCRIPTION OF THE DISCLOSURE

The copper foil of the instant disclosure typically has:
(a) a shiny side with a surface roughness (Rz) in the range of 0.6 to 1.9 μm;
(b) a matte side with a surface roughness (Rz) in the range of 0.6 to 1.9 μm; and
(c) a lightness L* value of matte side, based on the L*a*b* color system, is in the range of 12 to 35.

In some cases, the copper foil has a shiny side with a surface roughness (Rz) in the range of 1.0 to 1.9 μm; and/or a matte side with a surface roughness (Rz) in the range of 1.0 to 1.9 μm. The roughness of the shiny side may be from about 0.6, 0.7, 0.8, 0.9, 1.0, or 1.1 μm to about 1.2, 1.3, 1.4, 1.6, 1.8, 1.9, or 2.0 µm. Likewise, the roughness of the matte side may be about 0.6, 0.7, 0.8, 0.9, 1.0, or 1.1 µm to about 1.2, 1.3, 1.4, 1.6, 1.8, 1.9, or 2.0 µm.

The thickness of the copper foil may be from about 1 µm, 2 µm, 3 µm, 4 µm, 5 µm, 6 µm, 7 µm, 8 µm, 9 µm, or 10 µm to about 30 µm, 35 µm, 40 µm, 45 µm, or 50 µm; from about 4 µm, 5 µm, 6 µm, 7 µm, 8 µm, 9 µm, or 10 µm to about 20 µm, 21 µm, 22 µm, 23 µm, 24 µm, or 25 µm; or from about 4 µm, 5 µm, or 6 µm to about 15 µm, 16 µm. 17 µm. 18 µm, 19, or 20 µm. Likewise, the copper foil may be about 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm, or 25 µm thick.

The recrystallization rate of the copper foil after electrodeposition can be represented by the change in tensile strength over time (e.g., time represented in minutes, hours, or days). See, e.g., FIG. 2. The copper foil typically has a room temperature recrystallization rate immediately after manufacture of below 36.5 kg/mm²/day, or of about 8 to about 20 kg/mm²/day. "Room temperature recrystallization rate" refers to change in tensile strength over time at a temperature of about 20 to about 26° C. (about 68 to about 79° F.). The room temperature recrystallization rate immediately after electrodeposition may be from about 5, 6, 7, 8, 9, or 10 kg/mm²/day to about 20, 25, 30, 35, or 36 kg/mm²/day.

In some cases, the tensile strength remains at or above 32 kg/mm² for at least 48 hours at room temperature (at a temperature of about 20 to about 26° C. (about 68 to about 79° F.)) immediately after electrodeposition of the copper foil. The tensile strength may be about 32 kg/mm² to about 54 kg/mm² for about 48 hours at room temperature immediately after electrodeposition of the copper foil. Likewise, the tensile strength may be about 30, 31, 32, 33, 34, or 35 kg/mm² to about 40, 42, 44, 45, 46, 48, or 50 kg/mm² at room temperature immediately after electrodeposition of the copper foil.

Figure 3:
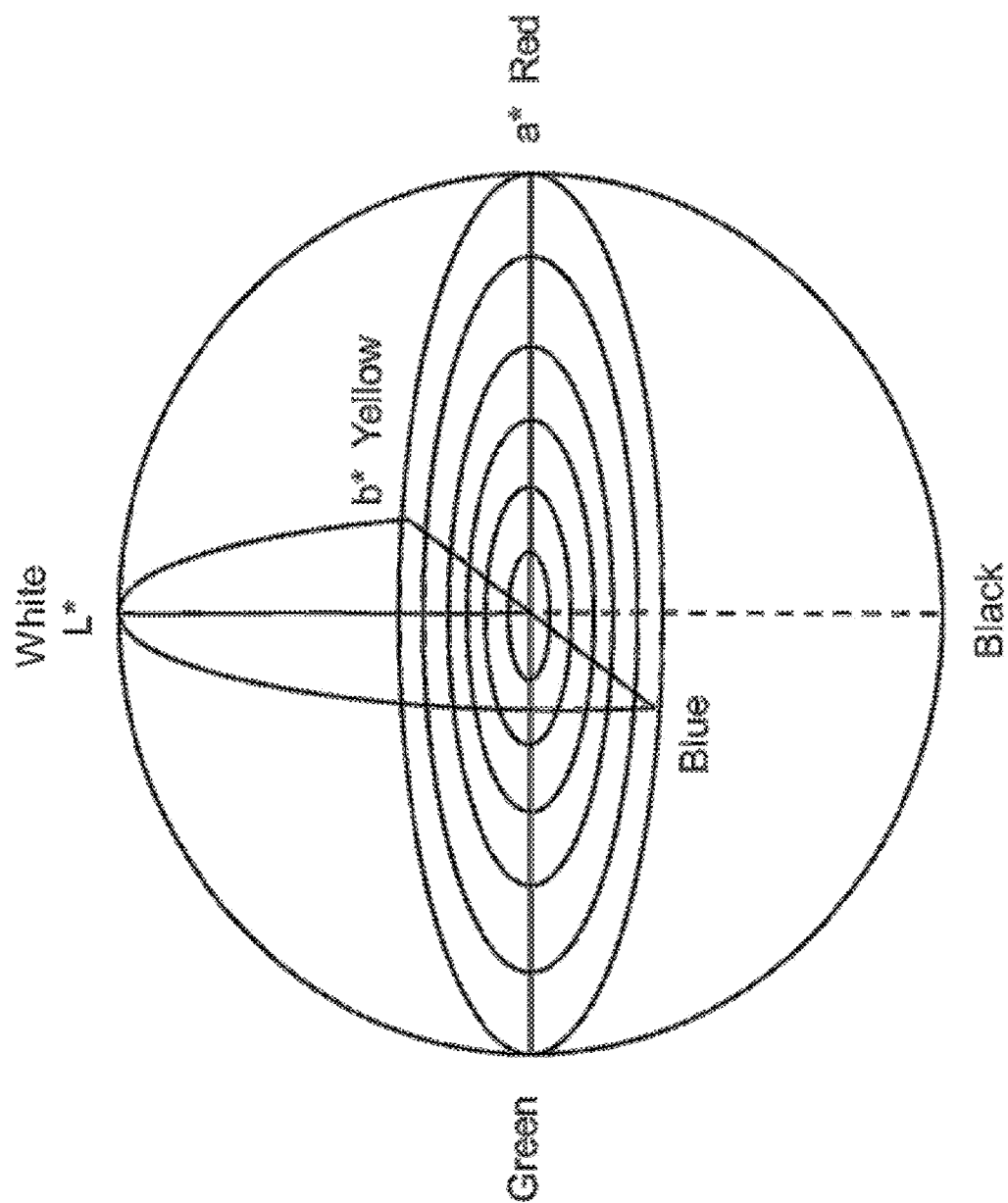
FIG. 3 is three-dimensional representation of the L*a*b* color space.
Figure 4:
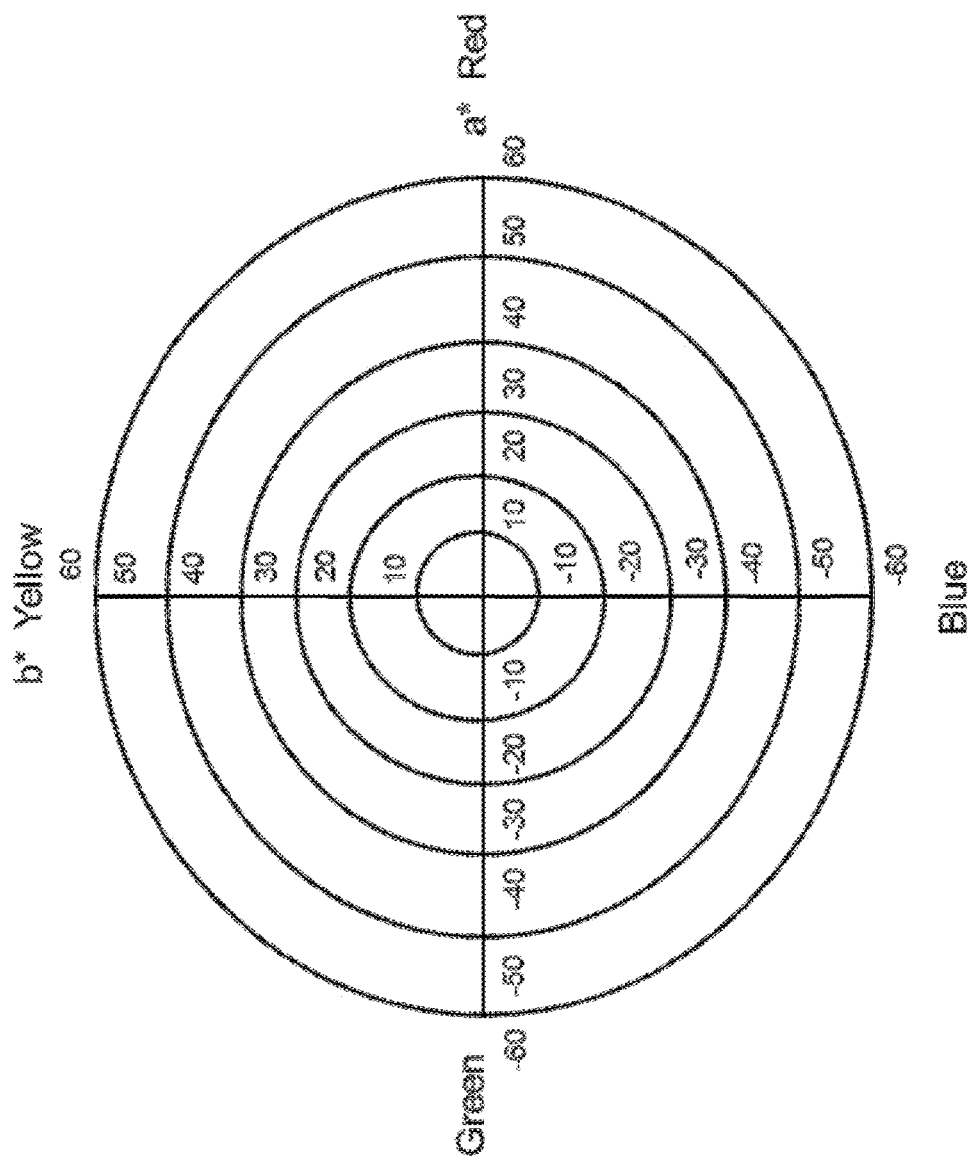
FIG. 4 is a cross-sectional view of the three-dimensional space of FIG. 3.

A relationship exists between the lightness of the matte side of the copper foil and room temperature recrystallization. The color of an object generally relates to three factors: brightness (lightness), hue (color shade), and chroma (clearness). For accurately measuring and expressing these factors, a colorimetric system to objectively express them as values is used. FIGS. 3 and 4 are explanatory views illustrating the L*a*b* colorimetric system. The L*a*b* colorimetric system is a colorimetric system described in JIS Z 8729, and assigns each color to a position in a spherical color space as shown in FIG. 3. In this color space, the brightness is represented by a position in the ordinate (z-axis) direction, the hue is represented by a position in the circumferential direction, and the chroma is represented by a distance from the center axis.

The position on the ordinate (z-axis) representing brightness is designated by L*, and the L* value changes from 0 corresponding to black to 100 corresponding to white. FIG. 4 is a cross-sectional view of the spherical color space horizontally taken along the plane of L*=50. As shown in FIG. 4, the positive direction of the x-axis corresponds to a red direction, the positive direction of the y-axis corresponds to a yellow direction, the negative direction of the x-axis corresponds to a green direction, the negative direction of the y-axis corresponds to a blue direction, and the position on the x-axis is designated by a* of which value changes from –60 to +60 and the position on the y-axis is designated by b* of which value changes from –60 to +60. The hue and chroma are represented by a* value and b* value, respectively.

The L* value of the matte side of the copper foil, based on the L*a*b* color system, is typically in the range of about 12 to about 35. The L* value may also be in the range of about 12 to about 30; or from about 10, 11, 12, 13, 14, 15 to about 20, 21, 22, 23, 24, 25, 26, 27, 28, 29, 30, 31, 32, 33, 34, 35, 36, 37, 38, 39, or 40.

Figure 2:
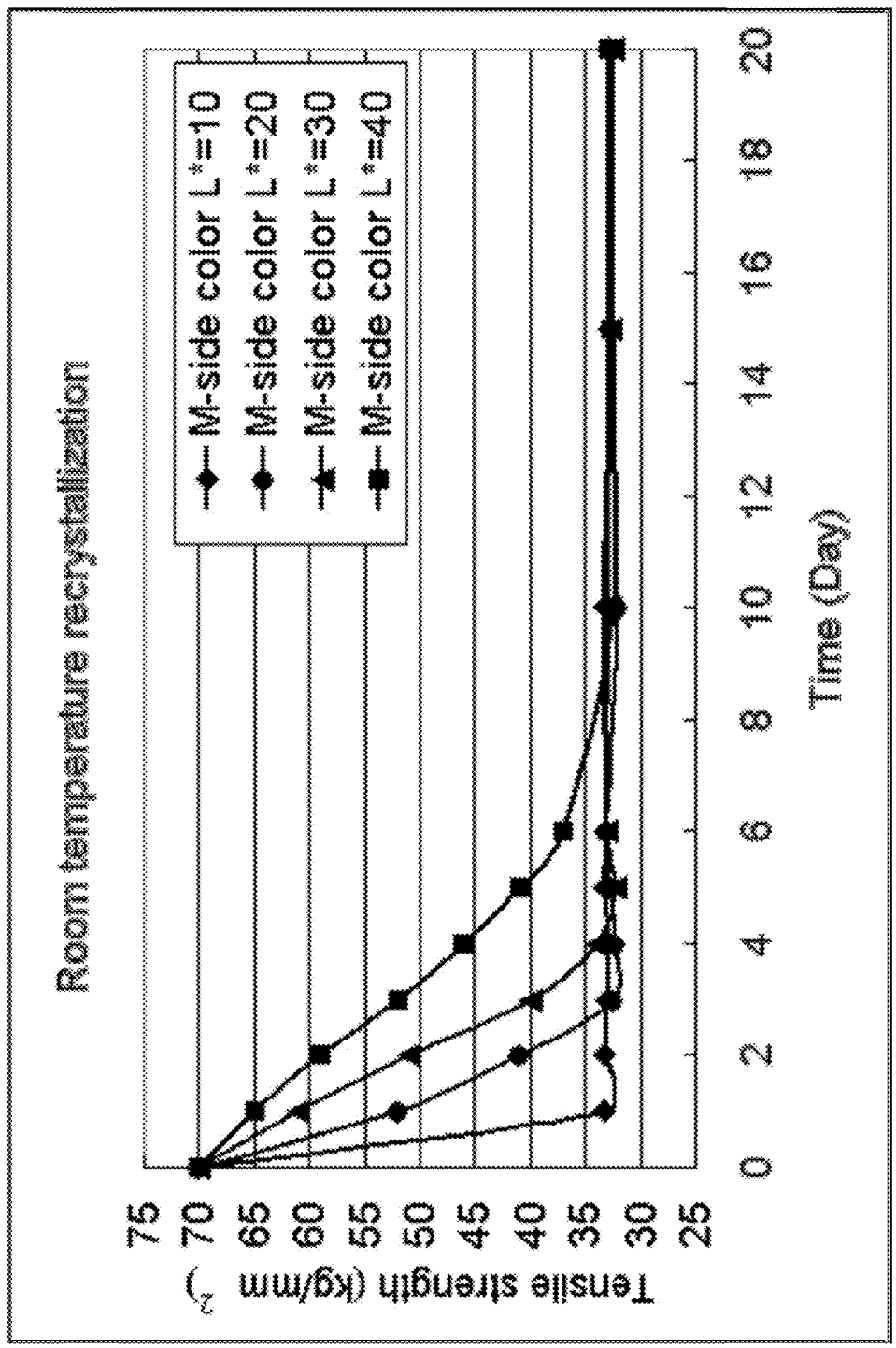
FIG. 2 is a graph showing the relationship between the L* of M-side of the copper foil and room temperature recrystallization.

FIG. 2. illustrates the relationship between the tensile strength, time, and L* value of the matte side of the copper foil. The copper foil has a very high tensile strength (about 70 kg/mm²) immediately after manufacture. At room temperature, the tensile strength drops, and stabilizes at about 30-35 kg/mm². If the room temperature recrystallization rate is too fast, there is insufficient time for the copper foil to relax and swelling, sagging, and wrinkling result. FIG. 2 shows the relationship between the L* value of M-side of the copper foil and room temperature recrystallization. The L* value can be used to illustrate the recrystallization of the copper foil.

The a* value of the copper foil, based on the L*a*b* color system, is usually in the range of about 4 to about 9. The a* value may also be from about 3, 4, or 5 to about 6, 7, 8, or 9. The b* value of the copper foil, based on the L*a*b* color system, is usually in the range of 2 to 10. The b* value may also be from about 2, 3, 4, or 5 to about 6, 7, 8, 9, or 10.

The instant disclosure also relates to processes for making the copper foil. For example, the copper foil may be produced by:
(a) preparing a copper sulfate electrolyte solution;
(b) performing an electrochemical reaction on the copper sulfate electrolyte solution, so as to obtain the copper foil described above:
(c) stripping the copper foil (detaching an electrodeposited copper from the cathode drum); and
(d) winding the copper foil.

Post electrodeposition treatment may also be included, for example, anti-tarnish treatments may be applied, the foil may be cut or sliced, and/or further treated with anode active materials. FIG. 1 is a diagram showing a manufacturing process for copper foil. After being electrodeposited on cathode drum 1 in an electrolytic bath 2, the copper foil 3 is fed through a series of rollers 4. The copper foil is carried through an anti-tarnish treatment 5 before being subjected to cutting with air knifes 6. Finally, the copper foil is wound 7, and subsequently packaged for shipment.

The instant disclosure further relates to methods for reducing the swelling, sagging, or wrinkling of the copper foil; and to methods for reducing or eliminating the rejection of copper foil resulting from undue swelling, sagging, and/or wrinkling.

The copper foil is particularly useful for use as an anode current collector. Often, the copper foil of the anode current collector is coated on one or both sides with an anode active material (or just "active material"). The active material may form one or more layers on or around the anode current collector and often contains carbon material. In such cases, the active material is sometimes referred to as a "carbonaceous material." Typical, non-limiting carbon materials include non-graphitizing carbon, artificial graphite, coke, graphite, glasslike carbon, carbon fiber, activated carbon, and carbon black.

The active material and/or carbonaceous material may include a conductive additive, a thickening agent, and/or a binder. The copper foils of the instant disclosure are useful in batteries, electronic devices comprising the batteries, and/or in the electronic devices themselves (not in the battery). For example, the copper foil may be used in electronic devices such as power tools, automobiles, electric vehicles including electric automobiles, cell phones, tablets, other portable electronic devices, etc.

The anode current collectors (or simply "anode") are suitable for use in lithium ion secondary batteries. These batteries typically include a positive electrode, a negative electrode (an anode) capable of absorbing and desorbing lithium ions, a separator interposed between the positive electrode and the negative electrode, and an electrolyte.

With respect to the structure or type of the secondary battery in which the copper foil of the instant disclosure may be incorporated, there is no particular limitation, and the secondary battery may be of a stack type including a negative electrode and a positive electrode stacked through a separator, or a spirally wound type including a continuous electrode and a separator spirally wound together. With respect to the form of the secondary battery, there is no particular limitation, and the secondary battery may be of a portable cylinder type widely used in laptop personal computer (PC) and the like, a rectangle type (rectangular cylinder type phone), a button type, or a coin type. As a packaging material for the secondary battery, a typical aluminum can, stainless steel can, laminated film, or others can be used.

Figure 5:
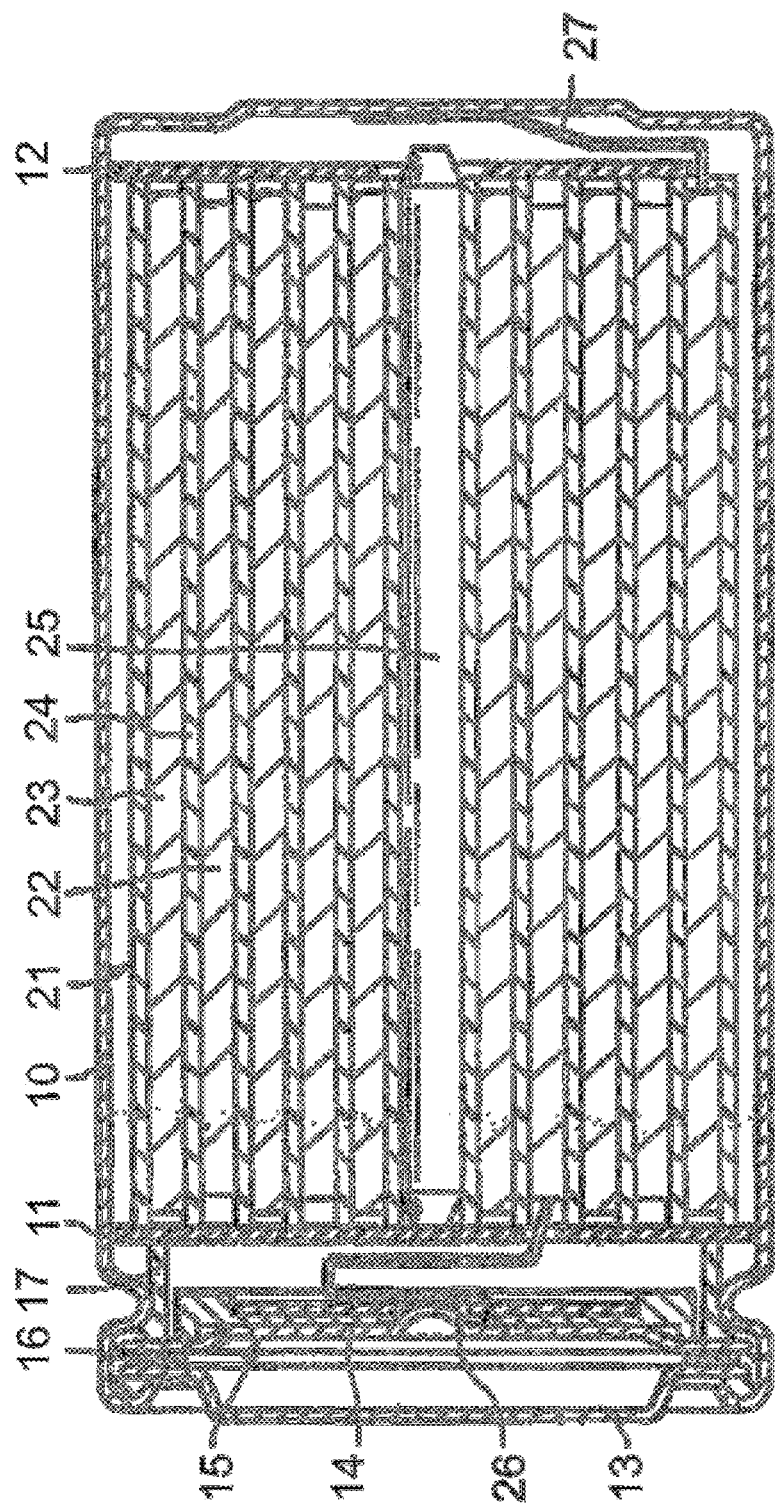
FIG. 5 is a cross-sectional view of a non-aqueous electrolyte lithium-ion secondary battery.

FIG. 5 shows the cross sectional structure of a non-aqueous electrolyte secondary battery of the cylindrical type. In a battery can 10 having a substantially hollow cylindrical column shape, a rolled electrode body 21 obtained by rolling a band-shaped positive electrode 22 and negative electrode 23 with a separator 24 in-between is provided. The battery can 10 is made of, for example, iron (Fe) plated with nickel (Ni). One end of the battery can 10 is closed and the other end is open. A pair of insulating plates 11 and 12 is placed vertical to the peripheral face of the roll so as to sandwich the rolled electrode body 21.

A battery cover 13, and a safety valve mechanism 15 and a PTC (positive temperature coefficient) device 16 which are provided inside the battery cover 13 are attached to the open end of the battery can 10 by being, caulked through a gasket 17, and the battery can 10 is sealed. The battery cover 13 is made of, for example, a material similar to that of the battery can 10. The safety valve mechanism 15 is electrically connected to the battery cover 13 through PTC device 16. When an internal short circuit occurs or the internal pressure of the battery increases to a predetermined value or higher due to heating from outside or the like, a disk plate 14 is turned upside down, thereby disconnecting the electrical connection between the battery cover 13 and the rolled electrode body 21. The PTC device 16 is used to limit a current by an increase in resistance value when the temperature rises to thereby prevent abnormal heating caused by a heavy current. The PTC device 16 is made of, for example, barium titanate based semiconductor ceramics, mixture conductive particle and polymer material. The gasket 17 is made of, for example, an insulating material and asphalt is applied thereon.

The rolled electrode body 21 is rolled around, for example, a center mandrel 25 as a center. A positive electrode lead 26 made of aluminum (Al) is connected to the positive electrode 22 and a negative electrode lead 27 made of nickel (Ni) is connected to the negative electrode 23. The positive electrode lead 26 is electrically connected to the battery cover 13 by being welded to the safety valve mechanism 15 while the negative electrode lead 27 is electrically connected to the battery can 10 by being welded.

The positive electrode 22 is composed of, for example, a positive electrode mixture layer and a positive electrode collector layer in a structure that the positive electrode mixture layer is provided on one side or both sides of the positive electrode collector layer. The positive electrode collector layer is made of, for example, metallic foil such as aluminum foil, nickel foil, or stainless foil. The positive electrode mixture layer contains, for example, manganese-contained complex oxide and nickel-contained complex oxide as will be described hereinafter, and further contains a conductive material such as graphite and a binder such as polyvinylidene fluoride when necessary.

The negative electrode 23 has a structure in which, for example, a negative electrode mixture layer is provided on one or both sides of a negative electrode collector layer like the positive electrode 22. The negative electrode collector layer is formed of copper foil according to the instant disclosure. The negative electrode can occlude or release lithium at a potential of, for example, 2 V or less with the lithium metal potential being the standard.

Examples of the material for a negative electrode capable of occluding and releasing lithium are a metal or a semiconductor capable of forming alloy or compound with lithium, and the alloy and compound of these. These materials are preferable since an excellent battery capacity can be obtained. Examples of the metals, the semiconductors, and alloys and compounds of those are magnesium (Mg), boron (B), aluminum (Al), gallium (Ga), indium (In), silicon (Si), germanium (Ge), tin (Sn), lead (Pb), arsenic (As), antimony (Sb), bismuth (Bi), cadmium (Cd), silver (Ag), zinc (Zn), hafnium (Hf), zirconium (Zr), yttrium (Y), and alloys and compounds of these. Other example of the compound of metals and semiconductors capable of forming alloys and compounds with lithium is the ones containing at least one kind of nonmetal element and one kind of 4B-Group element except carbon (C).

Examples of the material for a negative electrode capable of occluding and releasing lithium are carbon materials, metal oxides, and polymer compounds. The carbon materials are most preferable since the materials can obtain an excellent cycle characteristic. Examples of the carbon materials are non-graphitizing carbon, artificial graphite, coke, graphite, glasslike carbon, high polymer calcined materials, carbon fiber, activated carbon and carbon black. The coke included pitch coke, needle coke and petroleum coke. The high polymer compound calcined material is a material obtained by calcining a high polymer material such as phenolic resin or furan resin at an appropriate temperature so as to be carbonated. Examples of the metal oxides are iron oxide, ruthenium oxide and molybdenum oxide, and examples of high polymer materials are polyacetylene and polypyrrole.

The separator 24 is formed of, for example, a porous film made of polyolefin-based material such as polypropylene or polyethylene or a porous film made of an inorganic material such as ceramic nonwoven cloth. A structure in which two or more kinds of the porous films are stacked may also be used.

The separator 24 is impregnated with a liquid electrolyte. The electrolyte is obtained by dissolving, for example, lithium salt in a solvent as electrolyte salt. Examples of appropriate non-aqueous solvents are propylene carbonate, ethylene carbonate, diethyl carbonate, dimethyl carbonate, 1,2-dimethoxyethane, 1,2-diethoxyethane, gamma-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, ester propionitrile, anisole ester, acetate ester, ester butyrate and propionate. One of these non-aqueous solvents alone, or two or more kinds are mixed to be used.

Examples of lithium salt are $LiClO_4$, $LiAsF_6$, $LiPF_6$, $LiBF_4$, $LiB(C_6H_5)_4$, $CH_3SO_3Li$, $CF_3SO_3Li$, $LiCl$ and $LiBr$. One of the materials alone, or two or more kinds are mixed to be used.

When the secondary battery is charged, for example, lithium ions are released from the positive electrode 22 and occluded by the negative electrode 23 via the electrolyte with which the separator 24 is impregnated. When the secondary battery is discharged, for example, lithium ions are released from the negative electrode 23 and occluded by the positive electrode 22 via the electrolyte with which the separator 24 is impregnated. The positive electrode 22 is formed containing the manganese-contained complex oxide including the first element, and the nickel-contained complex oxide including the second element so that the battery capacity can be maintained even after preservation at a high temperature, thereby obtaining a high capacity retention ratio. Also, a large discharging energy can be obtained when a high load discharging is performed under the condition of high potential cutoff at, for example, 3.3 V.

Figure 6:
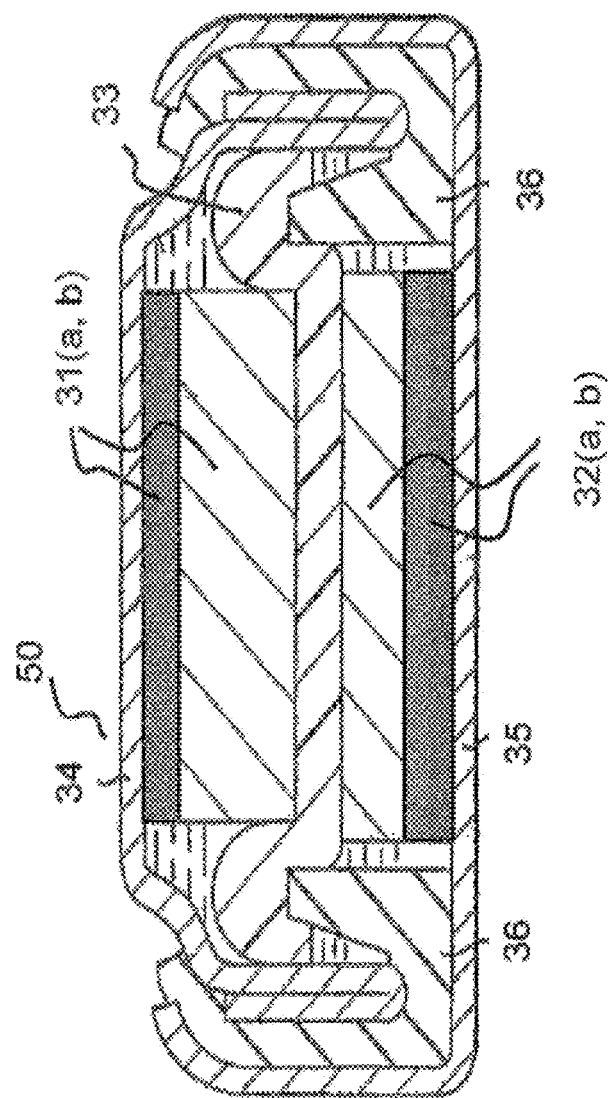
FIG. 6 is a cross-sectional view showing another example of a lithium-ion secondary battery (coin type)
Figure 7:
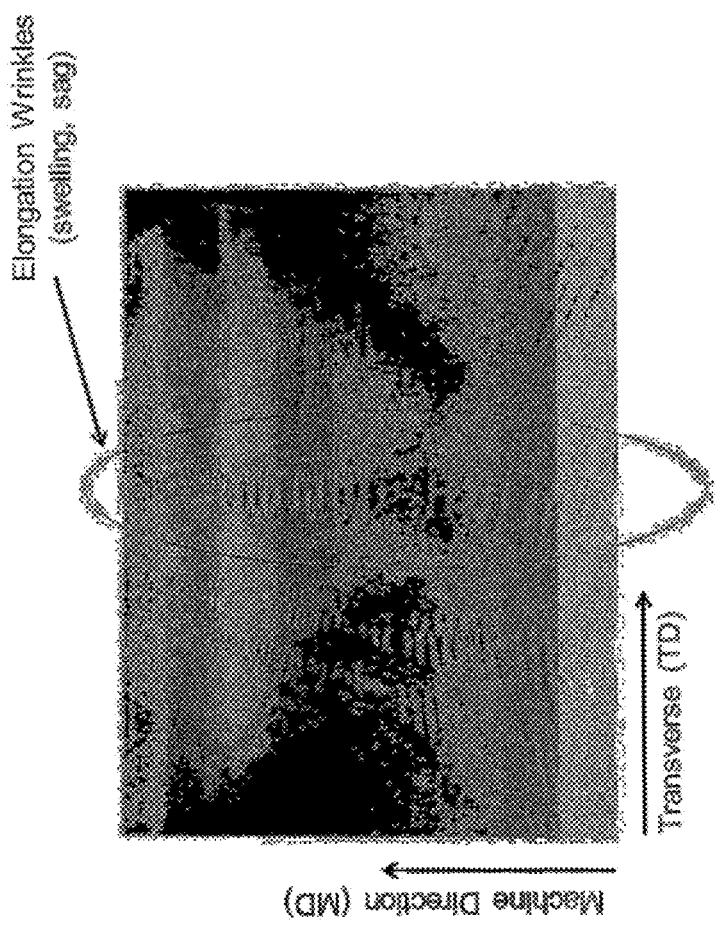
FIG. 7 shows elongation wrinkling of copper foil.

FIG. 6 is a cross-sectional view showing a coin-type lithium-ion secondary battery. The secondary battery 50 includes a negative electrode 31 contained in a packaging cup 34 and a positive electrode 32 contained in a packaging can 35, which are stacked through a separator 33. The edges of the packaging cup 34 and packaging can 35 are caulked through an insulating gasket 36 to close the battery. Each of the packaging cup 34 and the packaging can 35 is made of a metal, such as stainless steel or aluminum (Al).

The negative electrode current collector 31a comprises a copper foil according to the instant disclosure. The copper foil is capable of forming an alloy together with the anode active material layer 31b. In this case, the formation of an alloy improves the adhesion between the anode active material layer 31b and the negative electrode current collector 31a, and hence the anode active material is prevented from being finely divided due to the expansion or shrinkage caused during the charging or discharging, thus preventing the anode active material layer 31b from being removed from the negative electrode current collector 31a. In addition, there can be obtained an advantage in that the electron conduction of the negative electrode 31 is improved.

The negative electrode current collector 31a may be made of either a single layer or a plurality of layers of copper foil. When the negative electrode current collector is made of a plurality of layers, it is preferred that the layer in contact with the anode active material layer 31b is made of a metal material capable of forming an alloy together with silicon and the other layer(s) is (are) made of a metal material which does not form an intermetallic compound together with lithium.

The surface of the negative electrode current collector 31a on which the anode active material layer 31b will be formed may be roughened. The anode active material layer 31b contains as an anode active material at least one member selected from a simple substance of silicon and a compound thereof, and a simple substance of tin and a compound thereof, and especially preferably contains silicon. Silicon has both excellent ability to form an alloy together with lithium ions and excellent ability to extract lithium ions from the alloyed lithium, and, when silicon is used for forming a lithium-ion secondary battery, a secondary battery having a large energy density can be achieved. Silicon may be contained in any form of a simple substance, an alloy, a compound, and a mixture thereof.

The anode active material layer 31b may be either of a coating type having a thickness of about 70 to 80 μm or of a thin film type having a thickness of about 5 to 6 μm.

The anode active material layer 31b of a coating type is formed, on the negative electrode current collector 31a, from fine particles of an anode active material made of at least one member selected from a simple substance of silicon and a compound thereof, and a simple substance of tin and a compound thereof, and optionally a conductor, such as a carbon material, and a binder, such as polyimide or polyvinyl fluoride. The anode active material layer 31b of a thin film type is formed, on the negative electrode current collector 31a, from an anode active material layer 31b made of at least one member selected from a simple substance of silicon and a compound thereof, and a simple substance of tin and a compound thereof.

The anode active material layer 31b may contain oxygen as a constituent element. Oxygen can suppress expansion and shrinkage of the anode active material layer 31b and prevent the lowering of the discharge capacity. It is possible that at least part of the oxygen contained in the anode active material layer 31b is bonded to silicon, and the silicon bonded may be present in the form of silicon monoxide or silicon dioxide or in another metastable state. In some cases, the oxygen content of the anode active material layer 31b is in the range of from 3 to 45 atomic %. The anode active material layer 31b may contain at least one constituent element other than silicon and oxygen. Examples of such elements include cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), and chromium (Cr).

The positive electrode 32 includes a positive electrode current collector 32a, and a cathode active material layer 32b formed on the positive electrode current collector 32a. The positive electrode current collector 32a is typically made of a metal material, such as aluminum, nickel, or stainless steel. The cathode active material layer 32b may contain, for example, as a cathode active material, at least one material which is capable of extracting lithium ions during the charging and re-occluding lithium ions during the discharging, and optionally a conductor, such as a carbon material, and a binder, such as polyvinylidene fluoride.

As a material capable of extracting and re-occluding lithium ions, preferred is a lithium-transition metal compound oxide including lithium and a transition metal element M, and being represented by, e.g., the general formula: $Li_xMO_2$. When the lithium-transition metal compound oxide is used in a lithium-ion secondary battery, the oxide can generate high electromotive force, and has a high density and hence can further increase the capacity of the secondary battery. In the above formula, M represents at least one transition metal element, preferably, e.g., at least one element selected from cobalt and nickel, and x varies depending on the charged state (or discharged state) of the battery, and is generally a value in the range of $0.05 \leq x \leq 1.10$. Specific examples of the lithium-transition metal compound oxides include $LiCoO_2$ and $LiNiO_2$.

When a particulate lithium-transition metal compound oxide is used as a cathode active material, either the powder may be used as it is, or at least part of the particulate lithium-transition metal compound oxide may have formed a surface layer including at least one member selected from the group consisting of an oxide having a composition different from that of the lithium-transition metal compound oxide, a halide, a phosphate, and a sulfate. In the latter case, the stability can be improved, making it possible to more surely suppress the lowering of the discharge capacity. In this case, the constituent element of the surface layer and the constituent element of the lithium-transition metal compound oxide may diffuse into each other.

The cathode active material layer 32b may contain at least one member selected from the group consisting of a simple substance and a compound of an element belonging to Group 2, Group 3, or Group 4 of the long-form periodic table. Examples of the elements belonging to Group 2 include magnesium (Mg), calcium (Ca), and strontium (Sr), and magnesium. Examples of the elements belonging to Group 3 include scandium (Sc) and yttrium (Y). Examples of the elements belonging to Group 4 include titanium and zirconium (Zr). The above element may be present either in the form of a solid solution in the cathode active material or in the form of a simple substance or compound at the grain boundary of the cathode active material.

The separator 33 separates the negative electrode 31 from the positive electrode 32 and prevents short-circuiting of current caused due to the contact of these electrodes, and permits lithium ions to pass through it. As a material for the separator 33, for example, a thin membrane of microporous polyethylene or polypropylene having formed therein a number of micropores may be suitable.

The electrolytic solution includes, for example, a solvent and an electrolyte salt dissolved in the solvent, and may contain an additive if necessary. Examples of solvents used in the electrolytic solution include non-aqueous solvents, e.g., cyclic carbonates, such as 1,3-dioxolan-2-one (ethylene carbonate; EC) and 4-methyl-1,3-dioxolan-2-one (propylene carbonate; PC), and chain carbonates, such as dimethyl carbonate (DMC), diethyl carbonate (DEC), and ethylmethyl carbonate (EMC). These solvents may be used individually, but the two solvents or more are preferably used in combination. For example, when a high-permittivity solvent, such as ethylene carbonate or propylene carbonate, and a low-viscosity solvent, such as dimethyl carbonate, diethyl carbonate, or ethylmethyl carbonate, are used in combination, high dissolving power for an electrolyte salt and high ion conduction can be achieved. The solvent may contain sultone.

The electrolytic solution may be either used as it is or used in the form of a so-called gel electrolyte which is made of a polymer compound having the electrolytic solution. In the latter case, the separator 33 may be impregnated with the electrolyte, or the electrolyte may be present in the form of a layer disposed between the separator 33 and the negative electrode 31 or positive electrode 32. As the polymer material, preferred is, for example, a polymer containing vinylidene fluoride, which has high oxidation-reduction stability. As the polymer compound, preferred is a compound formed by polymerization of a polymerizable compound. Examples of polymerizable compounds include monofunctional acrylates, such as an acrylate; monofunctional methacrylates, such as a methacrylate; polyfunctional acrylates, such as a diacrylate and a triacrylate; polyfunctional methacrylates, such as a dimethacrylate and a trimethacrylate; acrylonitrile; and methacrylonitrile, and, of these, preferred is an ester having an acrylate group or a methacrylate group, which easily undergoes polymerization and has high polymerizable compound reactivity.

EXAMPLE 1

Manufacture of Electrolytic Copper Foil

Copper wires were dissolved in a 50 wt % sulfuric acid aqueous solution to prepare a copper sulfate electrolyte solution containing 320 g/l of copper sulfate ($CuSO_4.5H_2O$) and 100 g/l of sulfuric acid. To per liter of the copper sulfate electrolyte solution, 4.55 mg of gelatin (DV: Nippi Company), 1.95 mg of hydroxyethyl cellulose (LC-400; DAICEL Company), 3.12 mg of sodium 3-mercapto-1-propanesulfonate (MPS: HOPAX Company), 0.39 mg of N,N'-Diethylthiourea (Alfa Aesar®; A Johnson Matthey Company), and 30 mg chloride ion were added. Subsequently, an electrolytic copper foil with thickness of 6 μm, 8 μm, and 20 μm were prepared at a liquid temperature of 50° C. and current density of 50 A/dm². The roughness, tensile strength, elongation, and the color of the matte side of the electrolytic copper foils were measured as described below, and are reported in the Table 1.

Measurements

Swelling: Swelling was visually measured on slitter machine. The slitter machine is typically used to check the copper foil's appearance and to cut it into a specific size. In the instant case, the copper foil (width: 1,380 mm) was fed between two horizontal fixed rollers (distance: 700 mm). Subsequently, the rolls were rotated to apply different tension to the foil. The foil was then visually inspected to determine whether swelling exists at steady state and ranked based on the results, as shown in the following table.

| Applied Tension (Kg) | Copper foil Appears (after applying tension) | Swelling Grade |
| --- | --- | --- |
| 0 | No swelling | 0 (good) |
| 5 | No swelling | 1 (slight) |
| 10 | No Swelling | 2 (moderate) |
| 10 | Swelling | 3 (Severe) |

Tensile Strength: Tensile strength is the maximum stress that a material can withstand while being stretched or pulled before failing or breaking. Tensile strength is not the same as compressive strength and the values can be quite different. Tensile strength was measured according to IPC-TM-650. The electrolytic copper foil was cut to obtain a test sample in the size of 100 mm×12.7 mm (length×width). The test sample was measured at room temperature (about 25° C.) under the conditions of a chuck distance of 50 mm and a crosshead speed of 50 mm/min by using Model AG-I testing machine of Shimadzu Corporation.

Roughness: Roughness was measured using according to JIS B 0601-1994 using an α-type surface roughness measuring instrument (Kosaka Laboratory Ltd; SE 1700 Series).

Elongation: Elongation was measured according to IPC-TM-650. The copper foil was cut to obtain a test sample in the size of 100 mm×12.7 mm (length×width). The test sample was measured at room temperature (about 25° C.) under the conditions of a chuck distance of 50 mm and a crosshead speed of 50 mm/min by using Model AG-I testing machine of Shimadzu Corporation.

Color L*a*b*: The color L*a*b* measurements were conducted based on the method of JIS Z 8722 (2000) using a spectrophotometer (Konica Minolta; CM2500c) ("Methods of color measurement—Reflecting and transmitting objects").

ΔTensile Strength/Time (kg/mm²/day): was calculated by using a starting tensile strength of 70 kg/mm², which was the average starting tensile strength of the foils.

Inventive Foils #1-15 in Table 1 below and Comparative Foils #1-12 in Table 2 below were prepared and their properties measured using the procedures described above.

TABLE 1

| Example | Thickness (μm) | Tensile Strength (kg/mm²) | Δ Tensile Strength/Time (kg/mm²/day) | Elongation (%) | Time to Stable Tensile Strength (days) | S-Side Roughness Rz (μm) | M-side Roughness Rz (μm) | M-Side L* | M-Side a* | M-Side b* | Swelling |
| --- | --- | --- | --- | --- | --- | --- | --- | --- | --- | --- | --- |
| 1 | 6 | 32.2 | 18.90 | 4.9 | 2 | 1.86 | 1.02 | 12.02 | 5.41 | 2.33 | 1 |
| 2 | 6 | 33.2 | 9.20 | 6.1 | 4 | 1.52 | 0.62 | 29.53 | 8.31 | 9.32 | 1 |

TABLE 1-continued

| Example | Thickness (μm) | Tensile Strength (kg/mm²) | Δ Tensile Strength/ Time (kg/mm²/ day) | Elongation (%) | Time to Stable Tensile Strength (days) | S-Side Roughness Rz (μm) | M-side Roughness Rz (μm) | M-Side L* | M-Side a* | M-Side b* | Swelling |
|---|---|---|---|---|---|---|---|---|---|---|---|
| 3 | 6 | 32.5 | 18.75 | 5.8 | 2 | 1.08 | 1.66 | 14.41 | 5.46 | 2.43 | 0 |
| 4 | 6 | 32.6 | 7.48 | 5.6 | 5 | 1.34 | 1.89 | 34.96 | 8.5 | 8.14 | 0 |
| 5 | 6 | 34.1 | 11.97 | 7.2 | 3 | 0.61 | 1.38 | 24.94 | 7.17 | 3.97 | 1 |
| 6 | 8 | 32.5 | 18.75 | 7.6 | 2 | 1.24 | 1.87 | 12.16 | 5.3 | 2.4 | 1 |
| 7 | 8 | 32.1 | 18.95 | 6.9 | 2 | 1.19 | 1.06 | 14.5 | 5.3 | 3.11 | 0 |
| 8 | 8 | 33.7 | 9.08 | 8.6 | 4 | 1.03 | 1.35 | 30.71 | 6.93 | 3.55 | 0 |
| 9 | 8 | 33.3 | 12.23 | 7.5 | 3 | 1.58 | 0.65 | 21.42 | 5.41 | 3.95 | 1 |
| 10 | 8 | 33.1 | 12.30 | 8.4 | 3 | 1.86 | 1.37 | 23.54 | 5.4 | 3.27 | 0 |
| 11 | 20 | 32.6 | 18.70 | 20.5 | 2 | 1.06 | 1.62 | 15.41 | 4.79 | 3.82 | 0 |
| 12 | 20 | 31.9 | 12.70 | 18.2 | 3 | 1.85 | 1.56 | 21.86 | 5.19 | 2.75 | 0 |
| 13 | 20 | 33.6 | 9.10 | 22.2 | 4 | 1.14 | 0.63 | 28.41 | 7.05 | 6.66 | 1 |
| 14 | 20 | 33.2 | 12.27 | 24.2 | 3 | 0.64 | 1.04 | 26.11 | 6.58 | 6.02 | 1 |
| 15 | 20 | 32.8 | 7.44 | 20.1 | 5 | 1.87 | 1.82 | 34.34 | 8.37 | 6.53 | 0 |

TABLE 2

| Comp. Example | Thickness (μm) | Tensile Strength (kg/mm²) | Δ Tensile Strength/ Time (kg/mm²/ day) | Elongation (%) | Time to Stable Tensile Strength (day) | S-side Roughness Rz (μm) | M-side Roughness Rz (μm) | M-Side L* | M-Side a* | M-Side b* | Swelling |
|---|---|---|---|---|---|---|---|---|---|---|---|
| 1 | 6 | 31.7 | 38.30 | 5.1 | 1 | 1.72 | 1.15 | 10.89 | 4.32 | 1.61 | 2 |
| 2 | 6 | 33.3 | 9.18 | 6.3 | 4 | 1.32 | 0.53 | 29.53 | 8.31 | 9.32 | 2 |
| 3 | 6 | 32.5 | 37.50 | 5.8 | 1 | 1.67 | 0.58 | 10.51 | 4.34 | 2.61 | 3 |
| 4 | 6 | 33.6 | 9.10 | 7.5 | 4 | 0.55 | 0.56 | 30.33 | 8.35 | 9.18 | 3 |
| 5 | 8 | 32.9 | 37.10 | 6.8 | 1 | 1.28 | 1.67 | 10.3 | 4.33 | 1.92 | 2 |
| 6 | 8 | 32.7 | 9.33 | 8.4 | 3 | 1.65 | 0.55 | 20.81 | 6.33 | 4.43 | 2 |
| 7 | 8 | 33.2 | 36.80 | 7.4 | 1 | 1.28 | 0.53 | 10.95 | 4.42 | 2.32 | 3 |
| 8 | 8 | 31.8 | 38.20 | 6.2 | 1 | 0.54 | 1.21 | 11.21 | 4.22 | 1.89 | 3 |
| 9 | 20 | 32.3 | 37.70 | 23.1 | 1 | 1.72 | 1.53 | 11.02 | 4.41 | 2.41 | 2 |
| 10 | 20 | 33.2 | 9.20 | 21 | 4 | 1.27 | 0.5 | 27.91 | 6.9 | 6.38 | 2 |
| 11 | 20 | 32.8 | 18.6 | 19.2 | 2 | 1.76 | 0.52 | 14.67 | 5.04 | 1.61 | 2 |
| 12 | 20 | 31.9 | 9.53 | 22.6 | 4 | 0.56 | 0.41 | 28.28 | 6.34 | 3.03 | 3 |

The data in the tables above show that copper foil having the characteristics set forth herein exhibit surprising and unexpected resistance to swelling, sagging, and wrinkling.

EXAMPLE 2

Coating the Electrolytic Copper Foil

An anode slurry may be prepared by using water as a solvent and the anode materials listed in the table below with a solid-liquid ratio of 73% (100 g of anode materials; 73 g of water).

| Anode Material | % Based on Total Weight of Anode Materials |
|---|---|
| Anode Active Material (Mesophase Graphite Powder Anode; MGPA) | 95 wt % |
| Conductive additive (Conductive Carbon Black; Super P ®) | 1 wt % |
| Thickening Agent (Carboxymethyl Cellulose; CMC) | 1.6 wt % |
| Water-Based Binder (Styrene-Butadiene Rubber; SBR) | 2.4 wt % |

After the components of the anode material formulation are mixed, the carbon material slurry is coated on the surface of copper foil at a speed of 5 meters per minute to a thickness of 200 μm and then dried through a 120° C. oven.

The above embodiments are only used to illustrate the principle of the present disclosure and the effect thereof, and should not be construed as to limit the present disclosure. The above embodiments can be modified and altered by those skilled in the art, without departing from the spirit and scope of the present disclosure. Therefore, the protection scope of the present disclosure is defined in the following appended claims. As long as it does not affect the effects and achievable goals of this disclosure, it should be covered under the technical contents disclosed herein.

The terms "comprising," "having," and "including" are used in their open, non-limiting sense. The terms "a" and "the" are understood to encompass the plural as well as the singular. The expression "at least one" means one or more and thus includes individual components as well as mixtures/combinations. The term "about" when referring to a value, is meant specifically that a measurement can be rounded to the value using a standard convention for rounding numbers. For example, "about 1.5" is 1.45 to 1.54. All valued set forth herein can be modified with the term "about" or recited without the term, regardless of whether the term "about" is specifically set forth (or is absent) in conjunction with any particular value. All ranges and values disclosed herein are inclusive and combinable. For examples, any value or point described herein that falls within a range described herein can serve as a minimum or maximum value to derive a sub-range, etc.

The invention claimed is:

1. An electrodeposited copper foil comprising:
   (a) a shiny side having a surface roughness (Rz) in the range of 0.6 to 1.9 μm;
   (b) a matte side having a surface roughness (Rz) in the range of 0.6 to 1.9 μm; and
   (c) a lightness L* value of the matte side, based on the L*a*b* color system, in the range of 12 to 35.

2. The electrodeposited copper foil of claim 1, wherein the shiny side has a surface roughness (Rz) in the range of 1.0 to 1.9 μm.

3. The electrodeposited copper foil of claim 1, wherein
   (a) the shiny side has a surface roughness (Rz) in the range of 1.0 to 1.9 μm; and
   (b) the matte side has a surface roughness (Rz) in the range of 1.0 to 1.9 μm.

4. The electrodeposited copper foil of claim 1, wherein the thickness of the foil is from 1 to 50 μm.

5. The electrodeposited copper foil of claim 1, wherein the thickness of the foil is from 4 to 25 μm.

6. The electrodeposited copper foil of claim 1, further comprising a carbonaceous layer on one or both sides of the foil.

7. The electrodeposited copper foil of claim 1 having a rate of recrystallization represented by change in tensile strength over time (tensile strength/time) immediately after manufacture of below 36.5 kg/mm$^2$/day.

8. The electrodeposited copper foil of claim 7 having a rate of recrystallization represented by change in tensile strength over time (tensile strength/time) immediately after manufacture of 8 to 20 kg/mm$^2$/day.

9. The electrodeposited copper foil of claim 1, wherein the tensile strength remains above 32 kg/mm$^2$ for at least 48 hours after manufacture.

10. The electrodeposited copper foil of claim 1, wherein the a* value of the matte side is in the range of 4 to 9 and the b* value of the matte side is in the range of 2 to 10, based on the L*a*b* color system.

11. A process for making the electrodeposited copper foil of claim 1 comprising:
   (a) preparing a copper sulfate electrolyte solution;
   (b) performing an electrochemical reaction on the copper sulfate electrolyte solution, so as to obtain the copper foil having
      (i) a shiny side having a surface roughness (Rz) in the range of 0.6 to 1.9 μm;
      (ii) a matte side having a surface roughness (Rz) in the range of 0.6 to 1.9 μm; and
      (iii) a lightness L* value of the matte side, based on the L*a*b* color system, is in the range of 12 to 35;
   (c) stripping the copper foil; and
   (d) winding the copper foil.

12. The process of claim 11, wherein the shiny side has a surface roughness (Rz) in the range of 1.0 to 1.9 μm.

13. The process of claim 11, wherein
   (a) the shiny side has a surface roughness (Rz) in the range of 1.0 to 1.9 μm; and
   (b) the matte side has a surface roughness (Rz) in the range of 1.0 to 1.9 μm.

14. The process of claim 11, wherein the thickness of the electrodeposited foil is from 1 to 50 μm.

15. An anode comprising an anode active material on an anode current collector, wherein the anode current collector comprises an electrodeposited copper foil of claim 1.

16. The anode of claim 15, wherein the anode active material contains carbon material.

17. The anode of claim 16, wherein the carbon material is selected from the group consisting of non-graphitizing carbon, artificial graphite, coke, graphite, glasslike carbon, carbon fiber, activated carbon, and carbon black.

18. A lithium ion secondary battery comprising a positive electrode, a negative electrode (an anode) according to claim 15, capable of absorbing and desorbing lithium ions, a separator interposed between the positive electrode and the negative electrode, and an electrolyte.

19. The lithium ion secondary battery of claim 18, wherein the positive electrode comprises a composite lithium oxide.

20. An electronic device comprising the battery of claim 18 selected from the group consisting of a power tool, an electric vehicle, a cell phone, a tablet, and a portable electronic device.

* * * * *